United States Patent [19]
Pierce

[11] Patent Number: 5,886,316
[45] Date of Patent: *Mar. 23, 1999

[54] METHOD AND APPARATUS FOR TREATING WASTE AND FOR OBTAINING USABLE BY-PRODUCT

[75] Inventor: Charles L. Pierce, Cleveland, Ohio

[73] Assignee: Consolidated Fusion Technologies, Inc., Columbus, Ga.

[ * ] Notice: The term of this patent shall not extend beyond the expiration date of Pat. No. 5,648,592.

[21] Appl. No.: 892,519

[22] Filed: Jul. 14, 1997

Related U.S. Application Data

[63] Continuation-in-part of Ser. No. 237,372, May 3, 1994, Pat. No. 5,648,592.

[51] Int. Cl.$^6$ .................................................. B23K 10/00
[52] U.S. Cl. ............................... 219/121.59; 219/121.36; 219/121.37; 219/121.65; 110/250; 110/346; 588/900
[58] Field of Search ......................... 219/121.36, 121.37, 219/121.38, 121.66, 121.44, 121.43, 121.59, 121.65; 110/346, 342, 242–250; 588/227, 119, 210, 212, 900, 222, 225, 252; 204/157.15, 158.2, 158.21

[56] References Cited

U.S. PATENT DOCUMENTS

| | | | |
|---|---|---|---|
| 4,479,443 | 10/1984 | Faldt et al. ............................... | 110/346 |
| 4,644,877 | 2/1987 | Barton et al. ............................ | 110/250 |
| 4,666,490 | 5/1987 | Drake ......................................... | 65/27 |
| 5,065,680 | 11/1991 | Cheetham ............................... | 110/342 |
| 5,127,347 | 7/1992 | Cheetham ............................... | 110/347 |
| 5,230,292 | 7/1993 | Workman et al. ....................... | 110/210 |
| 5,552,675 | 9/1996 | Lemelson ............................ | 315/111.21 |
| 5,648,592 | 7/1997 | Pierce ...................................... | 588/227 |
| 5,673,635 | 10/1997 | Fowler .................................... | 110/345 |

Primary Examiner—Mark H. Paschall
Attorney, Agent, or Firm—Jones & Askew, LLP

[57] ABSTRACT

The present invention is directed to the art of treating waste using laser technology. Industrial and toxic waste materials are irradiated with a laser inside a spherical reactor chamber such that they are heated to high temperatures. Organic compounds are thermally destroyed and chemical bonds are broken. Cool oxygen is pumped into the reactor to provide a refractory protective shield. Silica is added into the vessel at the high temperatures and encapsulates any heavy metals into its crystal matrix. The resulting solidified product may have a hardness of at least 8 on the Knoops scale of hardness and may be used as tooling, road material, oven lining, building materials and the like.

10 Claims, 6 Drawing Sheets

METHOD AND APPARATUS FOR TREATING WASTE AND FOR OBTAINING USABLE BY-PRODUCT

This is a continuation-in-part of Ser/ No. 08/237,372 filed May 3, 1994, now U.S. Pat. No. 5,648,592.

FIELD OF THE INVENTION

The present invention is directed to the art of converting solid and/or liquid waste matter into a pyroclastic material without discharging pollutants into the atmosphere. Coherent and electromagnetic radiation emitted by a $CO_2$ laser is used to break down the components of waste to a molecular level. Energy and additional coherent and electromagnetic radiation are derived in the process. The resulting pyroclastic material is of sufficient hardness to be useful in forming tools or other products, and may also be ground down to form road bed material.

BACKGROUND OF THE INVENTION

Much of today's industrial and municipal waste is processed in incinerators, rotary kilns and/or placed in land fills. As land fills reach their capacities, consideration must be given to providing environmentally sound alternative means to treating waste. Also, while incinerators and rotary kilns serve to reduce the overall volume of waste which must be discarded, they do not provide for the destruction of toxins and dioxins which lead to air and water pollution. In addition, prior methods of disposing waste are often expensive, call for long distance transport, and are considered to be blights on the landscape due to their large smokestacks and the significant amounts of acreage which they require. The present invention uses laser technology to overcome these drawbacks of the prior art.

The laser has been known for years as a worthwhile means for separating isotopes and for enriching material for uses other than those directed to waste conversion as described herein. When a material is irradiated by a laser of sufficient density, a highly ionized gas or plasma is formed by vaporizing the material into a semi-solid mass. In the plasma state, matter can be renewed or stripped apart into individual components. Thus, by exciting a particular mass to its upper energy state, several things happen. Electrons from the material are driven to this upper state and emit photons before returning to ground state. Although the photons have no mass, they have kinetic energy which is released during this transition. As a result, free radicals are caused to bombard the waste material being irradiated, causing the material to separate and bond to other materials to form a new element or compound. Any toxins or dioxins which are released in the plasma field and by irradiation are completely destroyed.

The present invention is directed to reducing, destroying or transforming municipal and industrial waste by using a laser in a reactor vessel. This laser reactor unit is unlike incinerators and rotary kilns of the prior art. The preexisting incinerators and rotary kilns do not generate temperatures above about 2000° F. This temperature is not sufficiently high to destroy toxins and dioxins present in or generated by waste. The laser reactor of the present invention is capable of achieving temperatures as high as 20,000° F., but generally operates in the range of about 6000° F. to about 10,000° F. Toxins and dioxins subjected to these temperatures are destroyed.

The high temperatures attained in the reactor, coupled with the laser's ability to break apart compounds, make the laser reactor system of the present invention ideal for reducing solid or liquid waste into a usable compound by completely sterilizing and reducing waste into a usable factor.

Poisonous gases such as dioxins, toxins and heavy metals are released into the atmosphere during the combustion process employed by incinerators and rotary kilns. These gases are unhealthy for human, plant and animal consumption as they adversely affect most forms of organic life. In addition, the poisonous gases adversely affect inorganic compounds.

The laser reactor of the present invention converts any gases which may be poisonous primarily to oxygen and also to carbon dioxide. The process is concealed from the atmosphere to reduce the risk for any undesirable NOX or sulfide emissions.

SUMMARY OF THE INVENTION

The present invention is designed to treat municipal and industrial waste solids and/or liquids by using coherent and electromagnetic radiation emitted by a $CO_2$ laser to break down components of waste to a molecular level. Energy and additional coherent and electromagnetic radiation are derived from the waste material being irradiated. The waste is then passed into a secondary chamber. There, it is charged with the same energy beam emitted from the laser through the means of a beam splitter. This raises the temperature of the secondary chamber. The second chamber is fed silica sand and waste to generate a glass-like material. The temperatures in this chamber approximate 4000°–6000° F. The high temperatures permit the liquification of the silica and waste. The waste is moved to the primary chamber to provide a binding material for the ground state matter that cannot be broken down. This binding material and ground state matter are subjected to a temperature in the range of about 6000°–10,000° F. These temperatures cause the matter to bind and become completely sterile, producing a solid inert material having a hardness of between about 8 and 9.5 on the Knoops scale of hardness. The Knoops scale of hardness is generally used in determining the hardness of rocks and minerals.

The gas that is emitted from the primary chamber into the secondary chamber is ionized by means of an ion generator which combines with a ring of a supersonic jet stream of water. This causes a sufficient space charge to capture any solid particulants that may have escaped the recycling process. Any solids that may particulate out of the reactor chambers are effectively removed and broken apart. After the gas has been ionized, it is recycled back to the primary chamber where it is used to sustain the plasma field that has been generated due to the reaction between the laser radiation, electromagnetic radiation and end material being converted. Once the gas has been recycled several times, it is flows out of the secondary chamber to a heat exchanger such as a water cooled particle trap where the temperature is cooled to about 600° F. The gas then flows into a caustic soda scrubber to neutralize any acids that may be left or created in the process. Thereafter, the gas is flowed into a standard electrostatic precipitator and bag house/cyclone combination to capture any particles that may have escaped the prior steps.

An advantage of the present invention is found in the fact that waste material is treated in such a manner to remove or reduce the need for incinerators, rotary kilns and the like. In addition, land fill space is freed-up.

Another advantage of the present invention resides in the beneficial aspects of treating waste in a pollution-free manner. Gaseous by-products are treated to exhaust primarily only oxygen and carbon dioxide. The need for land fills is reduced. Waters are not polluted.

Yet another advantage of the present invention is found in the by-product of the waste treatment process. A pyroclastic material is formed applying principles of fusion. This material has a hardness of at least about 8 on the Knoops scale and thus may be used for road construction, tooling, oven lining, and other valuable areas where hardness is a concern.

These and other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

DETAILED DESCRIPTION OF THE PREFERRED EMBODIMENT

Figure 1:
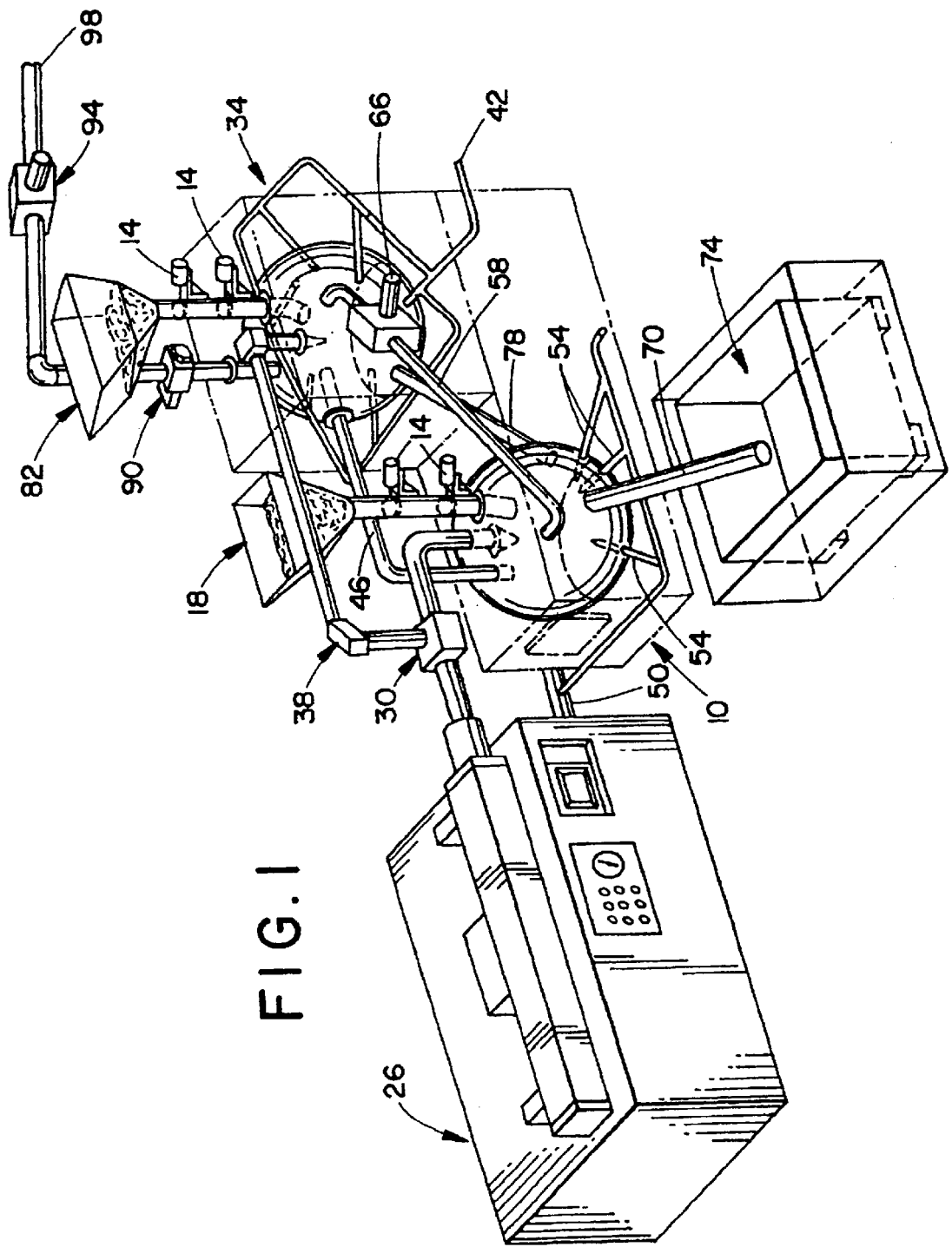
FIG. 1 is a schematic representation of the overall process of the present invention.

The present invention calls for the introduction of kinetic energy in the form of photons produced by a $CO_2$ laser of high density along with the electromagnetic energy produced at the same time by the same device impacting on the waste material to be destroyed. Waste material subjected to the laser in a reaction chamber vaporizes and produces a plasma. Upon producing this plasma, metal ions are released, thus reinforcing the plasma field. The electromagnetic radiation produced by the laser accelerates electrons within the field. As the plasma field expands within the chamber, its chemical composition changes provided that the $O_2$ oxidizer being used forms tricarbon trioxide, $C_3O_3$, an isotope of carbon.

The tricarbon trioxide reacts with the other materials entering the reaction chamber. It also reacts with the liner of the chamber and breaks down to carbon monoxide CO. Carbon monoxide is a flammable gas. Heat is generated during the process. The optical pumping of the laser (light) photons generates an angular momentum. This momentum transfers into a collection of atoms which are released in this gaseous state. The absorption of this frequency and momentum is extremely high and is known as a neutronic reaction. There is moisture in the material that is placed in the reactor. As a result, because of the high temperature achieved in the reactor, any carbon which is present reacts with the oxygen in water vapor to produce carbon monoxide. Both the carbon monoxide as well as the free hydrogen which is released are flammable and explode in the presence of oxygen. The amount of release must be controlled. As a result, in the presence of ice, the combination of CO and hydrogen with oxygen from a cool oxygen source at temperature in the range of greater than 4000° F. produces carbon dioxide $CO_2$ and a corresponding amount of heat. Thus, cooled oxygen from a cool oxygen source is pumped into the primary reactor to provide a refractory liner.

Because of the Gaussian distribution of particle energies, any moisture or water present will become free hydrogen and free oxygen. A plasma of ionized hydrogen and oxygen is produced which in turn produces several electron volts of energy. Temperatures in the range of tens of thousands ° C. are achieved. At these temperatures, atoms recombine to form new elements and compounds which are inert. Organic compounds are thermally destroyed at these temperatures as the various chemical bonds are broken. While the reactor is exposed to these high temperatures, silica is introduced into the reaction vessel. The silica becomes molten and encapsulates any heavy metals which do not break apart from the bonds which hold them together. The heavy metals are thus encapsulated into a crystal matrix of extreme hardness. Heavy metals are in the molten state after atomization in the reaction chamber after organics are destroyed. The plasma is then cooled to begin the solidification process of the heavy metals and the added silica. Upon solidifying the heavy metals are encapsulated within the crystal matrix of the silica. The resulting material is a useful by-product of the present process and may be reused in the grinding and tooling industry. The hardness of the resulting by-product material far surpasses the hardness of aluminum oxide (Knoops hardness of 6–7) as well as silicon carbide (Knoops hardness of 7–9) which is useful for grinding and cutting of metals in the industry. In addition, the material by-product can be used for road bedding or as an oven liner or the like because of its desirable level of heat refracting capacity.

The overall process may be set up as a permanent stand alone structure, or may be in the form of portable truck mounted equipment. In either situation, the following equipment is required: a laser, two reactor vessels along with beam binding and beam positioning equipment as well as beam containment piping. Also, a particulate trap and soda scrubber along with a unit for laser gases and a box for replenishing gases are needed for the portable or truck mounted operation. In addition, there is a water scrubber, as well as chilling equipment for the laser gas before recycle. There is also a unit for air evacuation into the atmosphere for remix.

When a material is heated, radiant energy is emitted. The nature of this energy depends upon the temperature of the radiating body and is independent of the particular type of material being heated. For this reason, it is expedient to define theoretically an ideal radiating surface that absorbs all energy incident upon it, reflecting none. All radiant energy emanating from this surface is emitted energy. This condition can be closely approximated (especially in the optical region) by coating a surface with finely granular loosely packed carbon. In an isothermal enclosure where no radiation can escape, all the radiation contained in the enclosure is emitted radiation. This makes the spectral composition equivalent to black body radiation, and can be approximated experimentally by designing an enclosure with a small hole through which the radiated energy can be observed.

When waste material enters the reactor, a laser beam heats the matter to 3000° F. or greater. An oxidizer is added to excite any non-combustible material to an excited state from level one transition to levels 2, 3 and 4. On level 4, photons are given off and the electrons change polarity and return to ground state. During this process, a plasma field is developed and all gases are ionized. This destroys all organic toxins. Also, the plasma field has a temperature of 6000° F. or greater and all dioxins are broken apart in their molecular state during the plasma phase. Upon oxidation, certain gases are formed. One is carbon dioxide which is a flammable fuel. Also created is a compound which is tricarbon trioxide which is extremely flammable, plus free hydrogen and free oxygen which in turn produce hydrogen fuel (i.e., rocket fuel) which can send the ambient temperatures way above 6000° F. At this temperature, plasma fusion is initiated. Once this happens, free radicals are released and fusion continues until the free radicals are stopped from being introduced into the reaction chamber. At this point, either the laser radiation or fuel source is removed. To slow the reaction, silica sand is added into the reactor to absorb most of the free radicals that are bombarding the material being reacted.

Waste material which may be treated by the present invention includes all varieties of municipal waste as well as toxic waste. Examples of items which may be treated include, but are in no way limited to, tires, all municipal waste, almost all industrial waste and most chemicals. The waste material is introduced into a primary reactor through a water-cooled rotary valve. The valve is preferably comprised of a material, such as ceramic, which is able to withstand high temperatures attained in the chamber of the reactor vessel. The valve serves to produce a basic vapor lock on the chamber to limit or eliminate emissions from the reactor. A hood is positioned adjacent the reactor to capture and cleanse any stray emissions.

As the waste is fed to the primary reactor chamber, it is met with a laser pulse from an anxil laser (a fast gas type $CO_2$ laser) which operates at up to 20 kW. This is the primary laser. Upon being irradiated with the primary laser, the waste emits a series of gases, beginning with hydrogen gas, the lightest of elements typically found in municipal waste. Then, in rapid order, various elements are emitted in gas phase in ascending order according to the periodic table.

The portion of the waste which is not a gas is referred to as melt. The melt remains in the reactor chamber. The melt in the chamber is surrounded with an envelope of "cool" oxygen which is usually at an ambient temperature of about 70° F. The oxygen which may be either trucked-in or extracted from on-site cryogenic facilities. The cool oxygen provides a refractory protective shield within the chambers.

The reactor operates at a moderately high partial vacuum. Off gases from the melt are pulled out of the reactor by blowers as well as thermodynamically induced flow. The gases are immediately ionized electrostatically to a plasma state. The off gases are not totally broken down to a submolecular state as a result of being irradiated by the first laser. They are thus forwarded on to a secondary or reburn reactor where a secondary laser completes the destruction process.

Preferably, pure oxygen is used as the reducing agent. While ambient air could be used, its use would bring undesirable components such as nitrogen into the reaction stream. The presence of nitrogen would lead to formation of NOX (nitric and nitrous oxides) as well as sulfides which are among the most virulent of pollutants.

The present process of treating waste is beneficial in that it offers an added advantage of supplying energy. For example, during the destruction sequence described above, hot plasma, which is at a temperature of up to about 10,000° F., usually around 6,000° F., may be drawn off and routed through a heat exchanger such as a liquid sodium heat exchanger, rapidly cooling the gas. The liquid sodium can then be sent directly to a turbine to spin a standard alternating current (AC) generator.

Alternatively, the plasma itself can flow through a magnetohydrodynamic generator where a direct current (DC) electropotential can be collected and passed along to an inverter for conversion to AC current to supply a distribution grid.

The cooled or supercooled gas enters a particle trap where entrained particles are precipitated. Non-ionized gases are diverted back to the reactor and subjected to the process once again.

Ionized hydrogen and oxygen pass through an electrostatic precipitator and then to a standard bag house where all vestiges of particulate matter are removed. Gases from the bag house pass through a standard lime-killed water scrubber and, after being mixed with ambient air for final cooling, flow to a draft inducing output.

The particles from the electrostatic precipitators and the bag house are recycled through the main reactor. They then flow to a secondary chamber where they are electromelted or encapsulated.

Water from the cooling system and the water scrubber is closely monitored and either caustic or acid is added to adjust the pH. All water used is recycled, not discharged to the environment. This water is filtered through carbon filters for purification. Spent cartridges are simply tossed into the waste stream.

The liquified melt in the primary reaction chamber is bombarded with photon energy across the entire spectrum. Photons from the carbon dioxide laser are of a specific frequency. However, by the time they have finished "bouncing around" within the melt and reflected from its enveloped surface (a phenomenon known as black body radiation), the entire photon spectrum is available to, first, break apart all the molecular bonds in the waste melt, and, second, to help recombine them into pyroclastic compounds.

As the complex reactions go to completion, very intricate bonds are formed. The final melt is a pyroclastic material of extreme density and hardness (rivaling granite in its physical properties, although more dense). The material flows as a magma to a cooling chamber where it hardens. As a magma, it can be cast or extruded into a variety of shapes such as curb stops, patio stones, building blocks, tomb stones, bar and sheet stock, etc. In a cooled state, it can be crushed and used in place of gravel in road construction due to its high-density characteristic.

The cooled magma, after it is crushed, also has an industrial use, as its main base composition is silicon carbide. The resulting material is essentially impervious to water leaching or atmospheric breakdown. Any hazardous material which may have unknowingly been mixed with acceptable waste, is capsulized in one of the long-chain molecular bonds, safely shielding the environment from pollution.

Referring now to the drawings wherein the showings are for purposes of illustrating the preferred embodiment of the invention only and not for purposes of limiting the same, the figures show schematic views of the apparatus which may be used in completing the process of the present invention. Flow diagrams are also included in the drawings to set forth the process steps observed herein.

Figure 2:
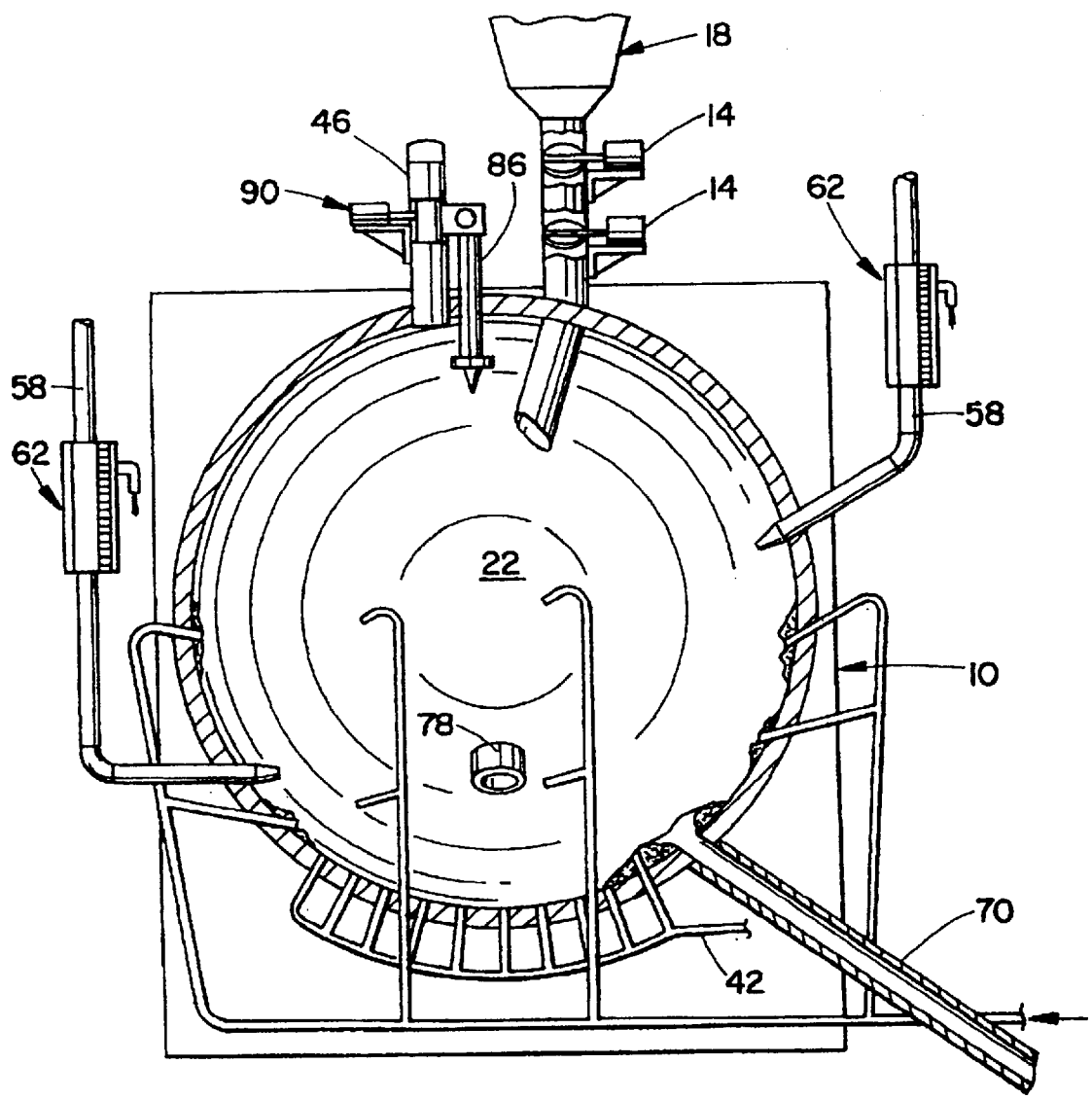
FIG. 2 is a schematic representation of the primary reactor vessel used herein.

With attention directed to FIG. 1 and FIG. 2, a reactor vessel 10 receives waste material through water-cooled rotary valves 14. A feed hopper 18 is positioned above the valves so that waste is able to enter or fall from an upper area in the reactor. Of course, waste may enter the reactor vessel through the bottom or sides of the vessel. The water-cooled valves 14 are comprised of a ceramic material which can withstand high temperatures which are achieved in the chamber 22. The reactor vessel itself may be comprised of one-half inch cold rolled steel.

As waste falls into or enters the reactor chamber 22 it is met with the laser pulse from an anxil ($CO_2$) laser of up to 20 kW. In FIG. 1, a modified laser system such as the A.E.M. laser system provided by All Electronics Mfg. Corp. of Cleveland, Ohio is shown as 26. A beam splitter 30 sits adjacent the laser system 26. At beam slitter 30, the beam is split between primary reactor 10 and second reactor 34. Depending on the route of travel of the laser beam, a beam bender may be present. FIG. 1 shows a 45° angle beam bender 38 which directs a laser pulse to the secondary reactor 34.

Upon being met with a laser pulse, the waste material is heated and outputs gases in ascending order on the periodic table. The melt portion which remains in chamber 22 is enveloped or surrounded with cool oxygen. The oxygen is supplied from cryogenic LOX (liquid oxygen) facilities and forms a refractory protective shield. The oxygen enters the reactor through conduit or $O_2$ inlet 42. The reactor operates at a moderately high partial vacuum.

Gases which form in the reactor are flowed out of the reactor. They may flow by way of blowers or simply by thermodynamically induced flow. Gases from the primary reactor flow to the secondary reactor through an exhaust flue 46. The secondary reactor is also referred to as a reburn reactor. The destruction process is completed with the secondary laser in the reburn reactor 34. Oxygen, which acts as an oxidizer and provides a combustible atmosphere, is supplied to the primary reactor through conduit 50. Accelerator ports 54 are also located about reactor 10 to provide a plasma vortex.

Any non-ionized gases in the secondary reactor are diverted back to the primary reactor to repeat the process steps. The gas is recycled through recycle conduit at 58 and passes through ion generator 62. The ion generator serves to ionize gas to a metastable state. A recycle blower 66 assists in flowing the gas through this process.

Liquified melt in the primary reaction chamber is bombarded with the photon energy across the entire spectrum. Molecular bonds present in the waste melt are broken apart and are recombined into a pyroclastic compound. The glowing magma is passed through a by-product drainage port 70 to a cooling bin or chamber 74 where it hardens.

A secondary drainage port 78 passes any solids or liquids from the secondary chamber to the primary reaction chamber. Silica may be added to the secondary chamber to provide a crystal matrix for encapsulation of any heavy metals or other toxins which may be present because they were not broken down. The silica feed hopper is shown in FIG. 1 at 82.

A laser wave guide 86 and electric knife valve 90 are shown in FIG. 2. The laser wave guide is a laser aperture with a collimating lens. The electric knife valve is a motor for rotating the gate valve.

In FIG. 1, a draft inducer 94 is used for start up and shut down of the process. In addition, exhaust may be sent to an existing flue at 98.

As disclosed in the figures, the reactors used in the present invention are of a spherical configuration. The 20 kW laser coupled with the spherical shape allow for temperatures in the range of 3,000°–20,000° F. to be achieved, and hence a neutronic reaction to occur. The waste materials in the reactor vaporize and are ionized, and the ionized gases enter a plasma state. This alters the molecular composition of the waste that is treated. Silica and carbon are added to the mixture to form silicon carbide. The silicon carbide matrix encapsulates what is left. The breakdown of silicon carbide is 1–5 million years.

The internal lining of the reactor is comprised of a material that can withstand the high temperatures achieved using the combination of a powerful laser and the spherical configuration. The material preferably is a ceramic composition, preferably an alumina silica oxide compound or a zirconium silica oxide compound.

Figure 3:
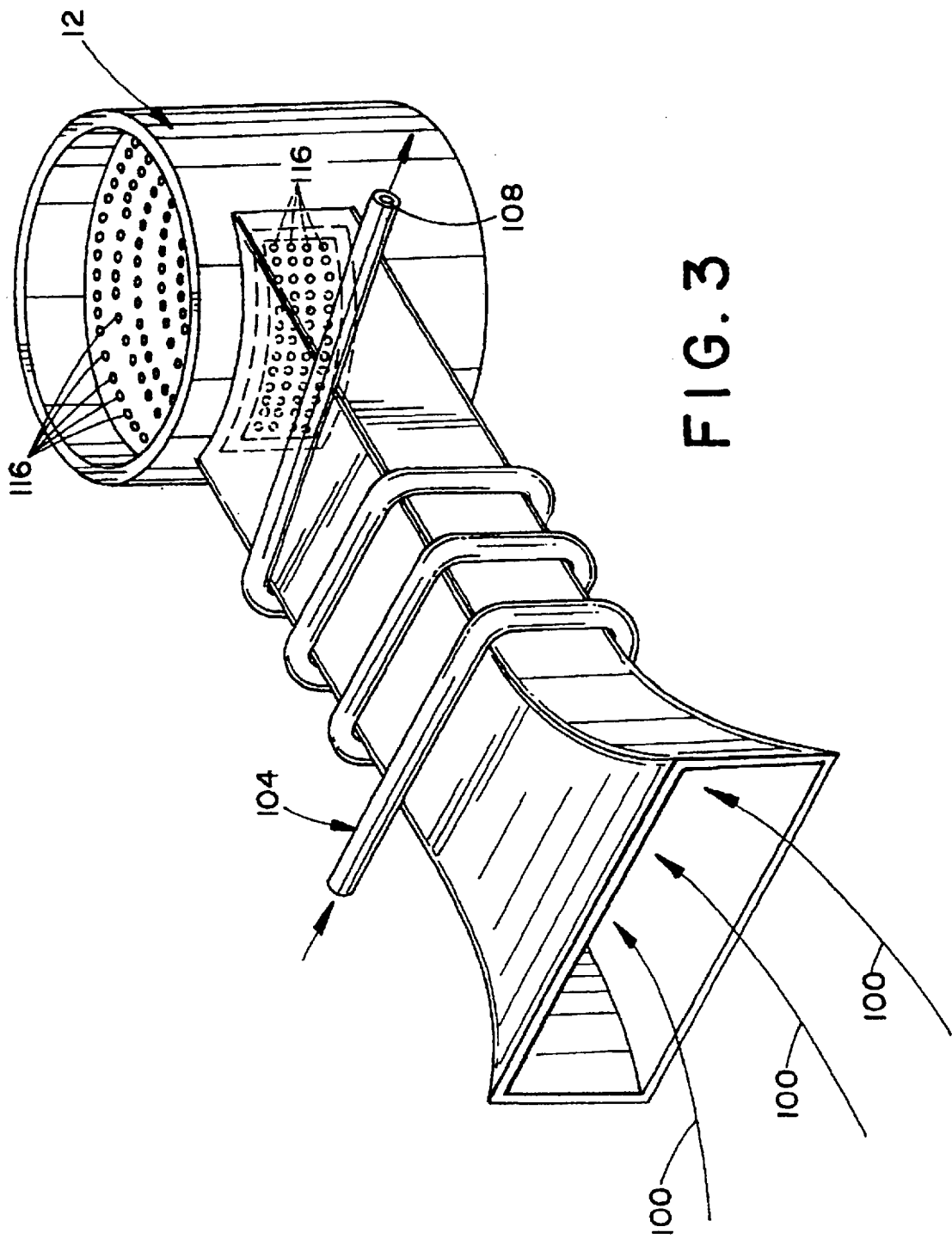
FIG. 3 is a schematic view showing gas flow from a secondary reactor and particle trap to the reactor nozzles.

Turning now to FIG. 3, a view of gas flow to the reactor nozzles is shown. Cooled recirculated flue gas from a 500 c.f.m. blower flows in as shown at 100. Water enters a coil tube at 104, circulates and exits at 108. The reactor is comprised of one-half inch cold rolled steel 112 and may have a diameter of roughly 20 inches. The gas ports 116 are comprised of a ceramic such as alumina. In the figure, there are 270 LOX ports.

Figure 4:
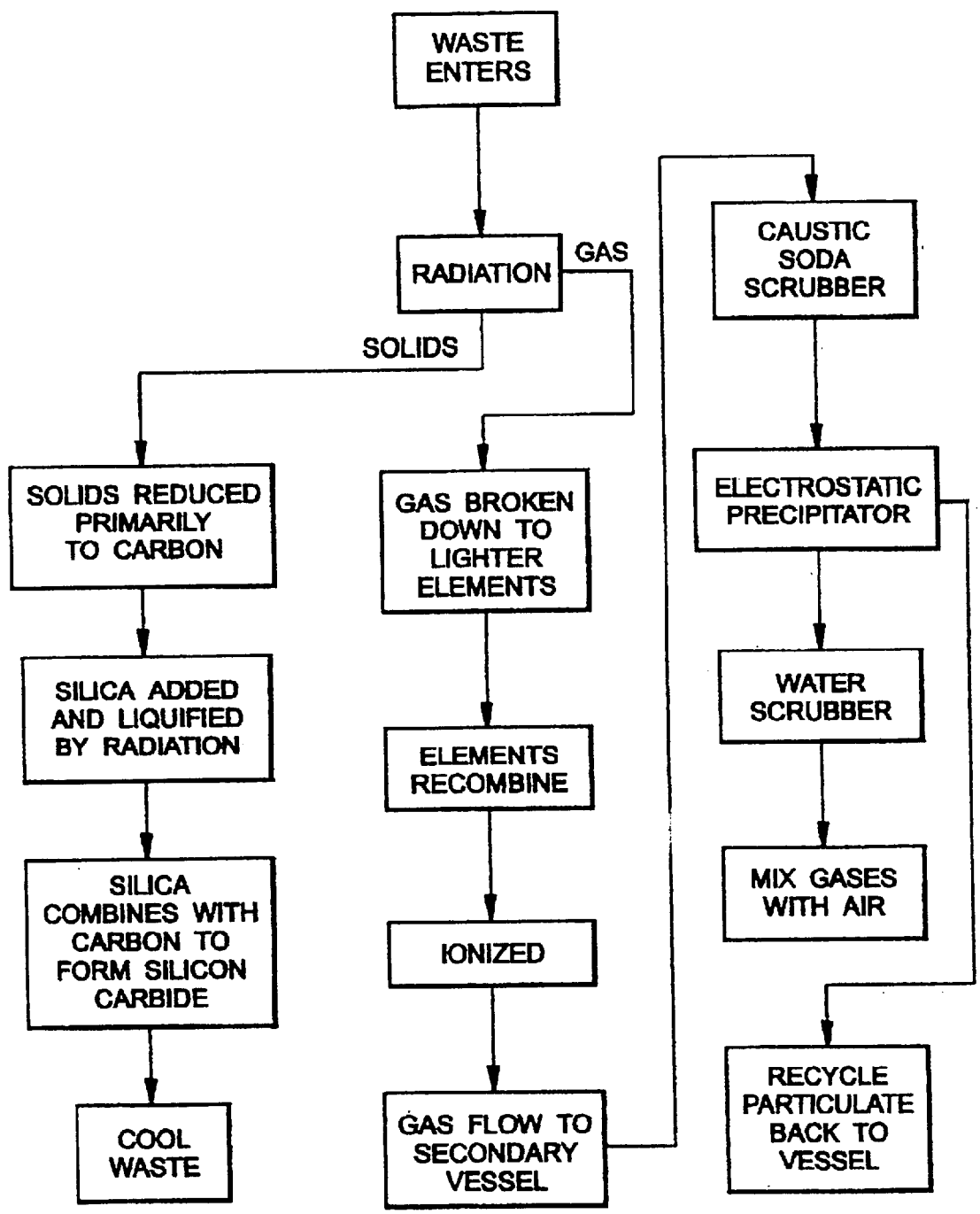
FIG. 4 is a block diagram flow chart showing the preferred embodiment process of the present invention.

FIG. 4 is a flow diagram identifying the steps involved in the process of the present invention. As shown in the flow diagram, waste enters the systems via a conveyor through a hopper located at the top of the reactor vessel. The waste passes through a series of two-gate valves. Next, waste is subjected to coherent and electromagnetic radiation produced by a $CO_2$ laser sufficient to super heat the material to a gaseous state, reducing the remaining waste to carbon.

The gases which are released are broken down into lighter elements including hydrogen, oxygen, carbon and sulfur. These elements then recombine to form new compounds such as hydrogen sulfide, carbon dioxide and tricarbon trioxide. The gases then ionized and heavy metal ions are produced. The ionized gases are at a temperature of 6000° or more. They are then subjected to cold plasma fusion which starts a neutronic reaction.

Silica is injected into a secondary chamber and is then bombarded by laser radiation so that it liquifies into a molten state. The molten silica enters the waste chamber by means of an internal duct between the two vessels where it combines with the carbon to form silicon carbide. Any heavy metals that did not ionize to form plasma become encapsulated into the silicon carbide and are trapped therein.

All gases which exit through the primary flue into the secondary vessel are recycled back into the waste chamber by means of blowers (i.e., Roots blowers) or similar pumps to contain the ionized gas within the two chambers.

Gases that are not needed are extracted by means of a draft inducer located on the main flue whereby a negative pressure is created within the two vessels. Most gases, mainly flammable gases, have been broken down to carbon dioxide. Gases at this point pass into a caustic soda scrubber which neutralizes any acids that may not have broken down properly or that may have formed during the process. They are then passed to a standard electro-static precipitator which removes any particulates that have passed through without being broken down. The particulates are recycled back to the reactor vessel and introduced into the liquid magma and subjected again to ionization.

After the gases leave the electrostatic precipitator, they are subjected to a water scrubber which further cleans any particulates or gases that may have been trapped during the process. They are then enclosed in a mixing chamber where they are mixed with ambient air and remixed into the atmosphere. There is no visible water vapor because the gas has been cooled to ambient temperatures.

As for the solids, once the waste has become encapsulated into and is in the liquid state, it is allowed to drain into a cooling hopper where any gasses or fumes are evacuated into the gas recycling system. Once the molten material has cooled into a solid state, it can be moved via a conveyor into trucks for resale or disposal.

Figure 5A:
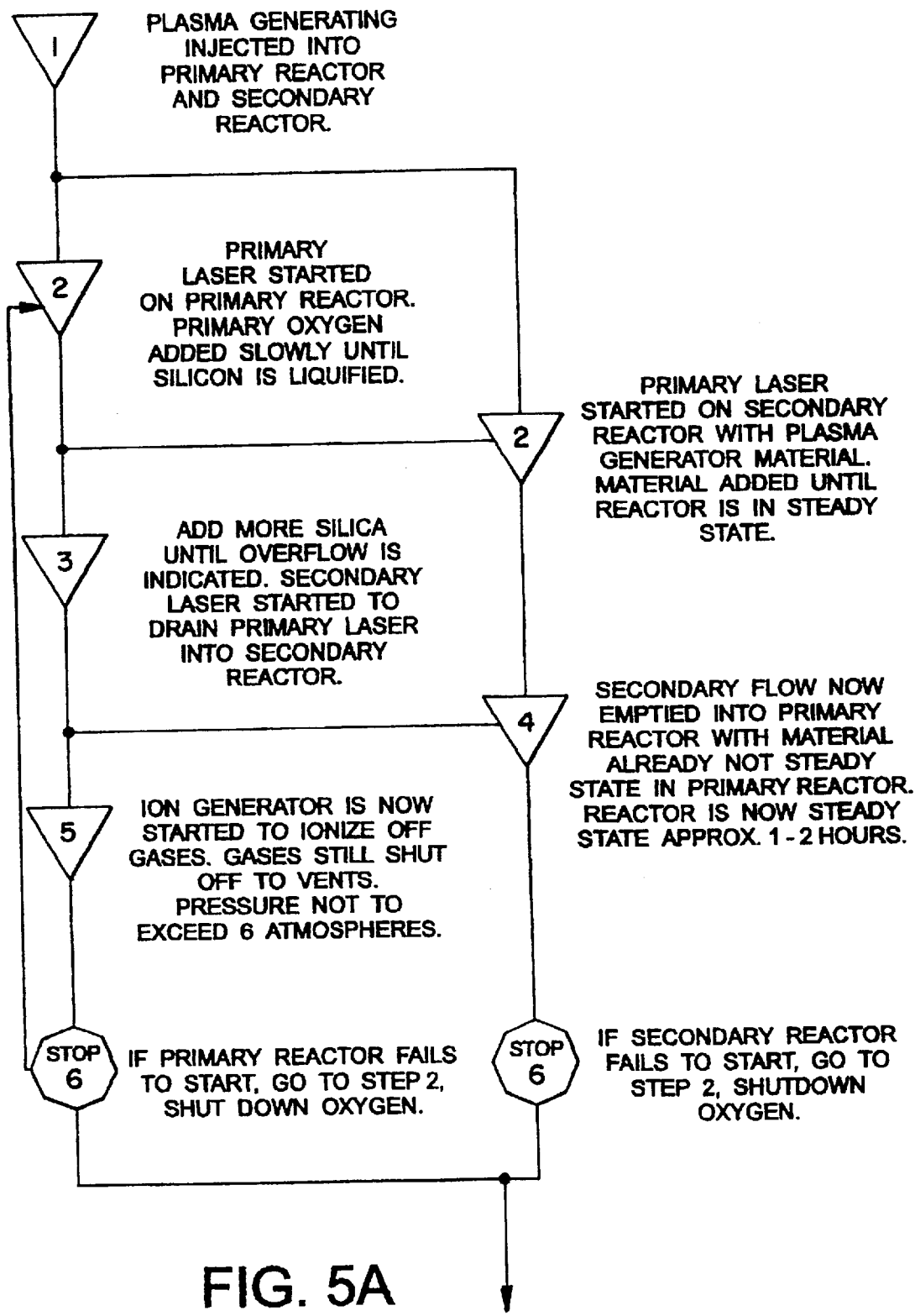
FIGS. 5A and 5B comprise a flow chart showing a start-up procedure which may be employed in the present invention.
Figure 5B:
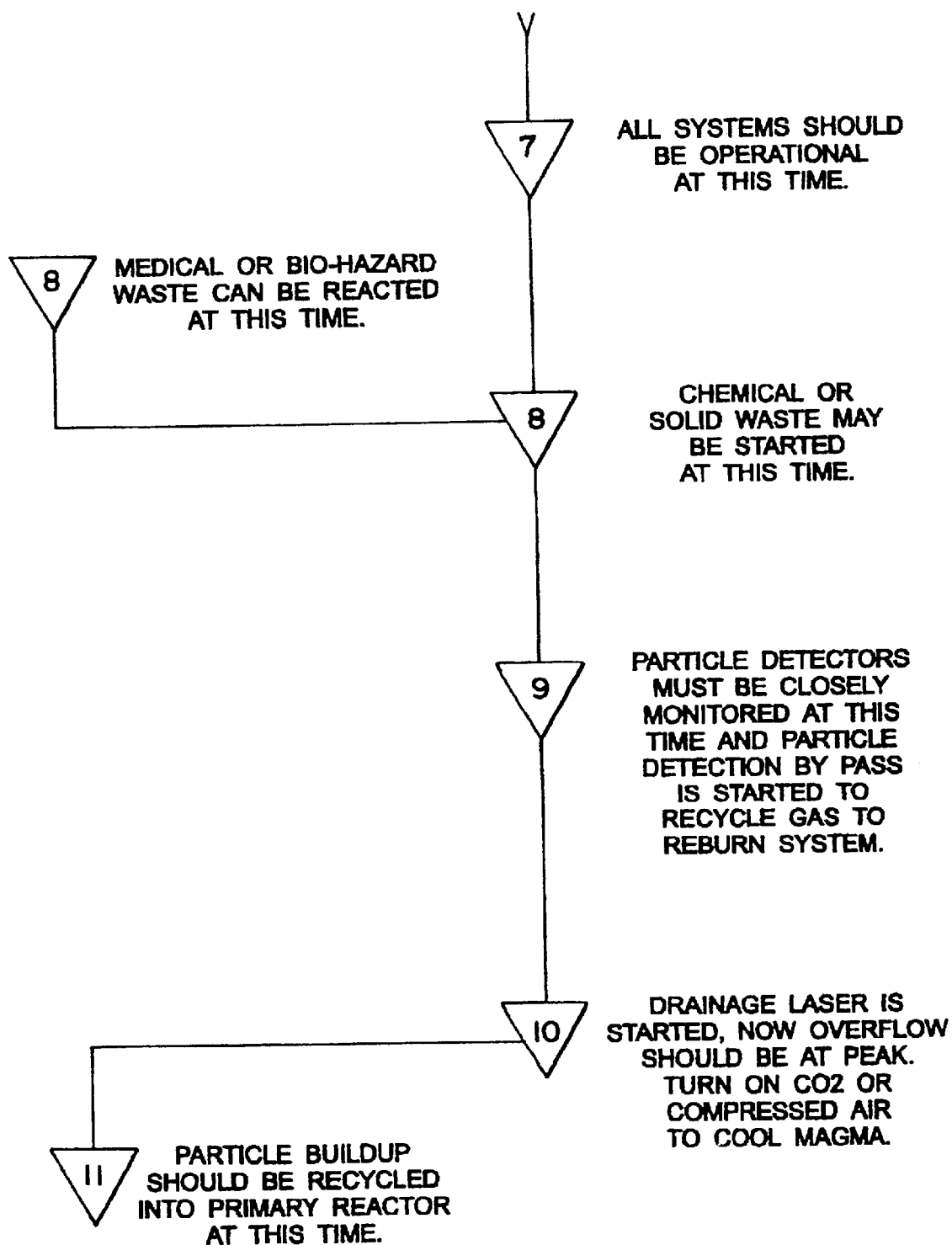

FIGS. 5A and 5B set forth a procedure for system start up. At the first step, plasma generating materials are injected into the primary reactor 10 and the secondary reactor 34. At the second step, the primary laser is started on the primary reactor and on the secondary reactor. Oxygen is added to the primary reactor slowly until the silica is liquified. In the secondary reactor, the primary laser is combined with a plasma generating material. This procedure continues until the reactor is operating at steady state.

Next additional silica is added to the primary reactor until overflow is indicated. At that point, materials in the primary laser are drained into the secondary laser. Thereafter, secondary flow empties into the primary reactor which operates at steady state. The reactor is run at steady state for approximately one or two hours. Subsequently, the ion generators are started to ionize off gases. As noted at the sixth step shown in FIG. 5, if either the primary or secondary reactor fails to start, oxygen flow to the system should be shut down.

Once the systems are entirely operational, waste materials may be added through feed hopper 18 and gate valve 14. Particle detectors are closely monitored and recycled gas is sent to the secondary or reburn system. Next, a drainage laser is started so that overflow is at its peak. The magma is cooled, and any particle build-up in the secondary reactor is recycled into the primary reactor.

The invention has been described with reference to the preferred embodiment. Obviously, modifications and alterations will occur to others upon a reading and understanding of this specification. It is intended to include all such modifications and alterations insofar as they come within the scope of the appended claims or the equivalent thereof.

I claim:

1. An assembly for treating waste, comprising:
   a primary spherical reactor defining an opening for receiving waste;
   a 20 kW laser for emitting a beam for breaking down waste to a molecular level in the primary spherical reactor and for producing a gas plasma and liquid melt;
   an oxygen source for supplying oxygen into the spherical reactor to act as a refractory shield within the reactor;
   a port for receiving silica into the spherical reactor vessel for providing a crystalline matrix for encapsulating hazardous materials present in the liquid melt; and
   a bin for cooling the liquid melt.

2. An assembly for treating waste, as set forth in claim 1, further including a secondary reactor downstream from the primary reactor for ionizing gas.

3. An assembly for treating waste, as set forth in claim 1, further including means downstream from the secondary reactor for removing solid matter from the gas.

4. An assembly for treating waste, as set forth in claim 1, wherein an interior lining of the spherical reactor is comprised of a ceramic compound capable of withstanding temperatures as high as 20,000° F. achieved during reactor operation.

5. A waste treatment apparatus, comprising:
   a spherical reactor vessel defining an opening for receiving waste therein;
   a laser having sufficient power to heat the waste in combination with the spherical reactor sufficiently to form a gas and cause a neutronic reaction to occur within said spherical reactor vessel; and
   an internal lining or surface within the spherical reactor vessel comprised of a material suited to withstand the temperatures achieved during the neutronic reaction.

6. The waste treatment apparatus of claim 5, further including:
   an oxygen supply source for supplying oxygen to the spherical reactor vessel to provide a refractory shield within the reactor.

7. The waste treatment apparatus of claim 5 wherein the internal surface of the spherical reactor is a ceramic compound.

8. The waste treatment apparatus of claim 7 wherein the internal surface is comprised of alumina silica oxide.

9. The waste treatment apparatus of claim 7 wherein the internal surface is comprised of zirconium silica oxide.

10. The waste treatment apparatus of claim 5 wherein the laser is a 20 kW $CO_2$ laser.

\* \* \* \* \*